J. T. TOWSLEY.
JOURNAL BOX.
APPLICATION FILED JUNE 27, 1913.
1,180,091.
Patented Apr. 18, 1916.
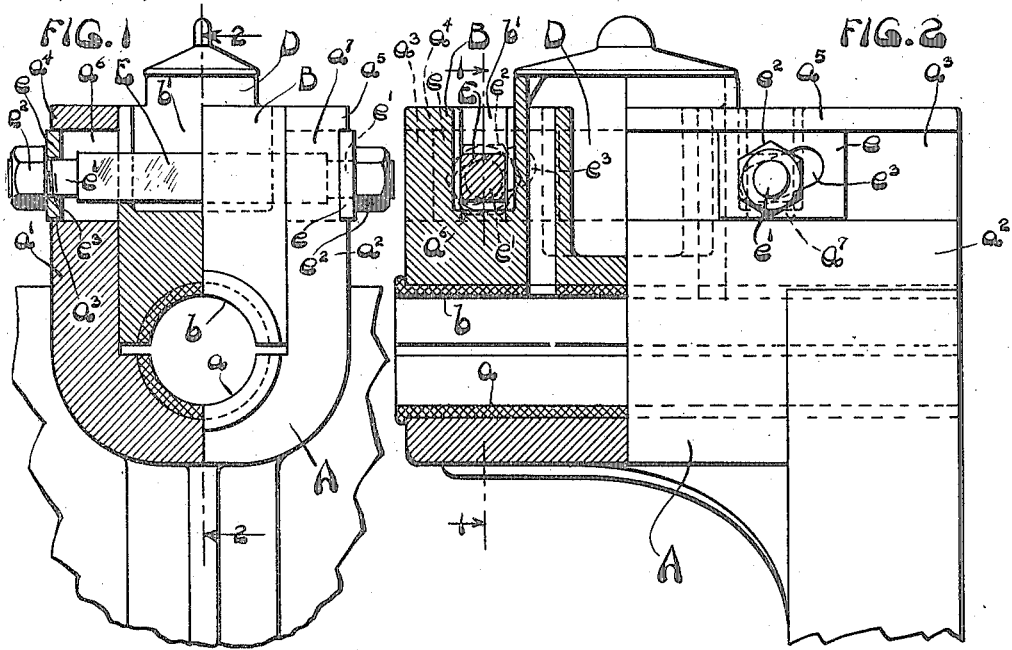
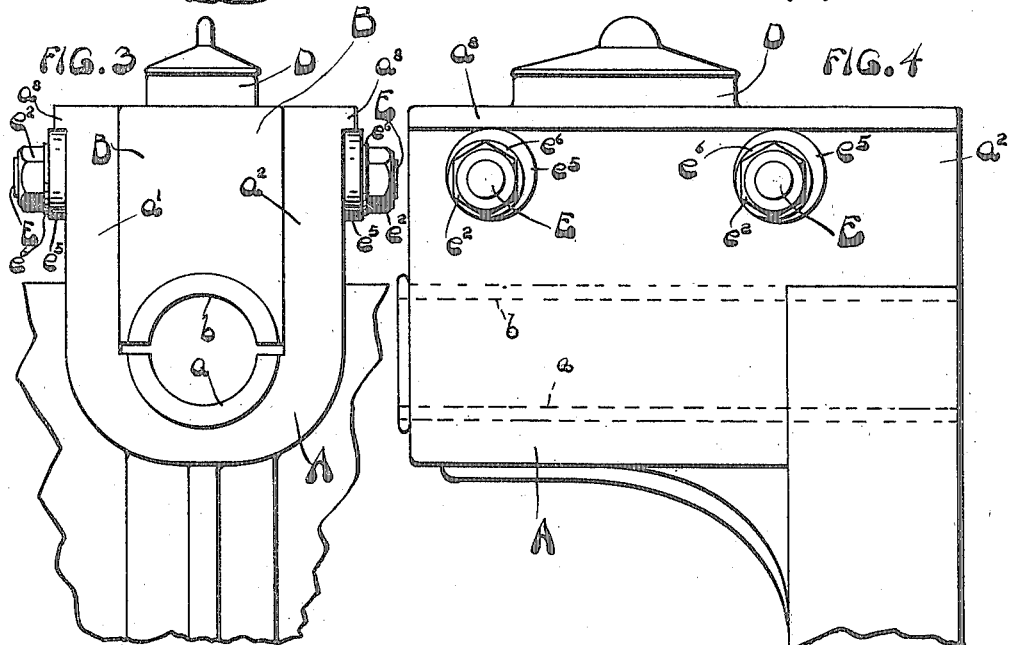
Witnesses
Inventor
John T. Towsley
By Walter F. Murray
Attorney
THE COLUMBIA PLANOGRAPH CO., WASHINGTON, D. C.

UNITED STATES PATENT OFFICE.

JOHN T. TOWSLEY, OF CINCINNATI, OHIO.

JOURNAL-BOX.

1,180,091.  Specification of Letters Patent.  Patented Apr. 18, 1916.

Application filed June 27, 1913. Serial No. 776,020.

*To all whom it may concern:*

Be it known that I, JOHN T. TOWSLEY, a citizen of the United States of America, and resident of Cincinnati, county of Hamilton, and State of Ohio, have invented certain new and useful Improvements in Journal-Boxes, of which the following is a specification.

The object of my invention is a journal box which is provided with a simple and efficient means for properly adjusting the bearings of a shaft.

A journal bearing embodying my invention is illustrated in the acompanying drawings, in which:

Figure 1 is a view partly in end elevation and partly in section on line 1—1 of Fig. 2 of a journal box embodying my invention. Fig. 2 is a view partly in side elevation and partly in section on line 2—2 of Fig. 1. Fig. 3 is a detail end view of a modified form of my invention. Fig. 4 is a detail side view of the form shown in Fig. 3.

Referring to the parts: The journal box embodies a lower member A, an upper member B which is supplied with an oil cup D, retaining pins E, and eccentric members or washers $e$, by means of which the upper member B is vertically adjusted in relation to the lower member A. The lower member A has a longitudinal semi-cylindrical groove $a$, in which the shaft bears. The shaft is not illustrated. Groove $a$ may be supplied with the usual friction or Babbitt metal. Upon each side of the groove are upwardly projecting side walls $a'$ $a^2$, which have longitudinally extending slots $a^3$ upon each side, which leave longitudinal ledges or projections $a^4$ $a^5$. Below the ledges the side walls $a'$ $a^2$ are provided with registering pin holes $a^6$ $a^7$. These holes are made larger than the pins E.

The upper member B is in the form of a block, which fits between the side walls $a'$ $a^2$ of the lower member, and has in its lower face a semi-cylindrical groove $b$, which forms the upper face of the bearing for the shaft. Block B has transverse slots $b'$, which are preferably rectangular in cross section, to fit the pins E.

Pins E are rectangular in cross section and have reduced screw-threaded ends $e'$, to receive nuts $e^2$. Washers $e$ are of a width such as to fit into the longitudinal groove $a^3$ and to be capable of reciprocation therein. Each washer has an eccentric or inclined slot $e^3$, to fit over the reduced end $e'$ of pin E. Preferably there are two pins E with their corresponding washers $e$ and nuts $e^2$.

In use: Block B is adjusted to the shaft by hand pressure while the nuts $e^2$ are loosened. Then the washers $e$ are adjusted, so as to hold the block to its desired position, and then the washers are locked in place by the nuts $e^2$. By this means the journal box may be adjusted to the shaft to the proper tension, without causing it either to bind upon the shaft or to allow it to be too loose in its bearings.

In the modification shown in Figs. 3 and 4, in place of the slot $a^3$, I employ simply a longitudinal ledge $a^8$ upon the side walls, and upon the pin E I mount a circular washer $e^5$, which has an eccentric hole to fit over the pin E. Between the washer $e^5$ and the nut $e^2$ I place a second friction washer $e^6$. The adjustment of the bearing is the same as that described for the forms shown in Figs. 1 and 2, except that the washer $e^5$ is adjusted to position by a rotating instead of a reciprocating motion, as is the case in the forms shown in Figs. 1 and 2.

What I claim is:

1. A journal box comprising a lower member with side walls forming a longitudinal way, said walls having pin ways and external projections, an upper member in the longitudinal way, a pin passing through the upper member and the pin ways, and members having a hole through which the pins pass and a periphery engaging the projections, the points of the periphery being at varying distances from the periphery of the hole.

2. A journal box consisting of a lower member, an upper member, retaining pins and adjusting members, the lower member comprising side walls with registering holes of a size greater than the pins and external projections above the holes, the upper member consisting of a block fitting between the side walls, and having transverse bores, the pins fitting the bores of the blocks and passing through the holes in the side walls, each adjusting member having a hole through which the pins pass and a periphery engaging the projection, the points of the periphery being at varying distances from the periphery of the hole.

3. A journal box consisting of a lower member, side walls having pin holes and external longitudinal ledges formed therewith, a block mounted between the side walls and having transverse pin bores, pins projecting through the holes and the bores, eccentric washers mounted rotatively on the ends of the pins and contacting with the longitudinal ledges of the walls, and nuts upon the ends of the pins adapted to lock the washers in adjusted positions.

In testimony whereof, I have hereunto subscribed my name this 25th day of June, 1913.

JOHN T. TOWSLEY.

Witnesses:
WALTER F. MURRAY,
W. THORNTON BOGERT.

Copies of this patent may be obtained for five cents each, by addressing the "Commissioner of Patents, Washington, D. C."